United States Patent [19]

Hamamura et al.

[11] Patent Number: 4,825,818

[45] Date of Patent: May 2, 1989

[54] BREATHER APPARATUS AND CAM CHAIN TENSIONER ADJUSTER APPARATUS IN FOUR-CYCLE ENGINE

[75] Inventors: Masahiro Hamamura; Yasuo Shimizu, both of Hamamatsu, Japan

[73] Assignee: Suzuki Jidosha Kogyo Kabushiki Kaisha, Shizuoka, Japan

[21] Appl. No.: 173,135

[22] Filed: Mar. 24, 1988

[30] Foreign Application Priority Data

Mar. 30, 1987 [JP] Japan ................................ 62-74538
Apr. 30, 1987 [JP] Japan ................................ 62-74539

[51] Int. Cl.$^4$ .......................... F01M 13/04; F01L 1/04
[52] U.S. Cl. .............................. 123/41.86; 123/90.31
[58] Field of Search ............. 123/41.86, 90.31, 196 R, 123/572

[56] References Cited

U.S. PATENT DOCUMENTS

| | | | |
|---|---|---|---|
| 2,821,174 | 1/1958 | Scheiterlein | 123/41.86 X |
| 2,855,910 | 10/1958 | De Waern | 123/41.86 X |
| 4,103,650 | 8/1978 | Nishida et al. | 123/41.86 |
| 4,602,595 | 7/1986 | Aoki et al. | 123/41.86 |
| 4,633,826 | 1/1987 | Tominaga et al. | 123/90.31 |
| 4,771,745 | 9/1988 | Nakamura et al. | 123/196 R |

FOREIGN PATENT DOCUMENTS 2007619 8/1971 Fed. Rep. of Germany ... 123/90.31
211705 11/1984 Japan ................................ 123/90.31

Primary Examiner—Tony M. Argenbright
Assistant Examiner—Eric R. Carlberg
Attorney, Agent, or Firm—Flynn, Thiel, Boutell & Tanis

[57] ABSTRACT

A breather apparatus for four-cycle engines of the overhead cam type for two-wheeled motorcycles in which a cam chain for driving an operational valve cam is suspended in a cam chain chamber formed so as to vertically penetrate the cylinder block. The cam chain chamber is arranged at a position which is slightly deviated in one direction perpendicular to the crank shaft. A breather chamber adjacent to the cam chain chamber is formed in the cylinder block in the opposite direction and is connected to a breather hole which opens to the upper portion of the cylinder head. An adjuster apparatus elastically contacts the back side of a chain tensioner to create a tension in the cam chain, and is disposed in a space in the cylinder block. The adjuster apparatus has a backward motion-preventing mechanism which is urged by a spring force so as to always push the chain tensioner. The backward motion of this mechanism is prevented and can be released by a screw member. A hole is formed in the cylinder block or crank casing to permit a driver to rotate the screw member.

7 Claims, 7 Drawing Sheets

BREATHER APPARATUS AND CAM CHAIN TENSIONER ADJUSTER APPARATUS IN FOUR-CYCLE ENGINE

FIELD OF THE INVENTION

The present invention relates to a breather apparatus and a cam chain tensioner adjuster apparatus in a four-cycle engine and, more particularly, to a breather apparatus for exhausting the blow-by gas from the crank chamber and a cam chain tensioner adjuster apparatus for allowing a proper tension to be maintained on the cam chain in a four-cycle engine.

BACKGROUND OF THE INVENTION

In a four-cycle engine, the blow-by gas which leaks through the gap between the piston and the cylinder collects in the crank chamber, and there is a possibility that the pressure in the crank chamber is abnormally raised. Therefore, it is necessary to provide a breather hole to permit the increased pressure to escape to the outside. However, since oil is located in the crank chamber and is violently stirred therein, the crank chamber is thus filled with scattered fine oil particles, so that there is an inconvenience such that if a simple breather hole is provided, then the oil component is also simultaneously drained to the outside through this breather hole. To avoid this, there is used a breather apparatus in which the exhaust gas is stored in a breather chamber (expansion chamber) having a proper volume, and the oil component is separated by a reduction in pressure and flow rate and is collected.

FIG. 1 shows an example of a known breather apparatus which is used in the engine for use in two-wheeled motorcycles. Breather chambers c and d are formed in the rear and rear upper portions in a main casing b which includes therein a crank chamber a. The gas passes via through holes e and f and is transferred through the breather chambers c and d and the oil component is separated. Thereafter, the gas is exhausted from a breather hole g into an air cleaner casing or the like. The separated oil is transferred through an oil return passage h, which is especially provided, and is returned to the oil in the oil pan.

In such a breather apparatus, in particular, since the oil return path h is arranged in the rear portion of the main casing b because of limitations on the available space, the casing becomes long due to the size of the mission casing. Therefore, the frame increases in size and the attaching position to the frame is located forwardly and the center of gravity is shifted to the front position, so that an adverse influence is exerted on safety in the running of the two-wheeled motorcycle.

On the other hand, in some engines of the overhead cam type, a breather chamber is formed in a head cover by use of a constitution such that the crank chamber is communicated with the inside of the head cover through a cam chain chamber. However, there are several problems in that the head portion of the engine increases in size and, in order to avoid interference with the fuel tank, the attaching position of the engine is lowered so that the road clearance decreases, and the like.

As mentioned above, most of the conventional breather apparatuses for four-cycle engines are arranged in a part of the inside of the main casing or head cover, so that there are problems in that the existence of the breather chamber causes the sizes of the mission casing and head cover to increase, and the degree of freedom in design and layout in installing the engine is reduced.

Also, in four-cycle engines, an operational valve cam to control the opening and closure of intake and exhaust valves is driven by a cam chain in accordance with the timing of the rotation of the crank shaft. In overhead cam type engines, in general, a cam chain is suspended in a cam chain chamber formed so as to vertically penetrate the cylinder block and cylinder head. Since the timing of the cam chain is disrupted when the tension is released, a chain tensioner is provided for one side of the cam chain, thereby giving a proper tension thereto. An adjuster apparatus is used to keep the proper tension.

The adjuster apparatus elastically presses the chain tensioner by the force of a spring. In general, the adjuster apparatus has a backward motion-preventing mechanism such as a ratchet mechanism or the like for inhibiting the backward motion in the releasing direction of the chain. However, in this case, it is necessary to provide a further mechanism to release the backward motion-preventing mechanism in order to permit the cam chain to be detached for maintenance or the like.

Therefore, in order to enable the backward motion-preventing mechanism to be easily released, the adjuster apparatus is ordinarily arranged outside the cylinder block. In this case, the projecting portion on the outside of the cylinder block is enlarged, so that the outside appearance becomes bad and the other parts are obstructed by this projection. Although there is a constitution such that the adjuster apparatus is disposed in the cylinder block by providing a space large enough to easily release the backward motion-preventing mechanism, this creates problems in that the size, weight, and cost of the engine increase.

As mentioned above, in the conventional cam chain tensioner adjuster apparatus for four-cycle engines, either the adjuster apparatus is disposed so as to project to the outside of the cylinder block or it is attached in the cylinder block by forming it with extra space therein Thus, there are problems such that the adjuster apparatus obstructs the easiness of layout and makes the external view bad, and the engine size increases and the like.

SUMMARY OF THE INVENTION

The present invention attempts to solve or at least improve upon the foregoing problems associated with conventional techniques, and it is a first object of the invention to provide a breather apparatus for a four-cycle engine in which an internal space is effectively used and a breather chamber can be formed without enlarging the outer dimensions of the engine.

To accomplish this object, according to a breather apparatus of the present invention, in a four-cycle engine of the overhead cam type in which a cam chain for driving an operational valve cam is suspended in a cam chain chamber formed so as to vertically penetrate the cylinder block, the cam chain chamber is arranged so as to be deviated or displaced in one direction perpendicular to the crank shaft, and a breather chamber adjacent to the cam chain chamber is formed in the cylinder block displaced in the opposite direction and is connected to a breather hole which opens through the upper portion of the cylinder head.

With this constitution, the cam chain chamber is formed so as to vertically penetrate one side of the cylinder block or the portion between adjacent cylinder bores in the case of a multicylinder engine. By arranging the cam chain chamber so as to be deviated or displaced sidewardly in one direction perpendicular to a plane defined by the crank shaft axis and the axis of the cylinder bore, an extra space is assured in the cylinder block in the opposite direction and the breather chamber can be easily formed in this space. Therefore, the cylinder block does not increase in size and the layout of the engine or the like is not adversely influenced.

To deviate or displace the cam chain chamber, an intermediate shaft which is drivingly interlocked with the crank shaft is arranged at a position in this direction and the cam chain is suspended to a cam chain drive sprocket gear on this intermediate shaft. As the intermediate shaft, a balancer shaft which rotates at the same speed as the crank shaft can be used.

Since the breather chamber is located just over the crank chamber, the gas pressure in the crank chamber can be easily relieved. In addition, a series of paths which pass upwardly through the cylinder head and exhaust the gas from the breather hole can be easily arranged as a compact path.

Further, the adjuster apparatus of the cam chain tensioner can be easily disposed in the cylinder block. In this case, the adjuster apparatus can be used as part of the wall to partition the cam chain chamber and breather chamber from one another.

On the other hand, it is a second object of the invention to provide an adjuster apparatus for a cam chain tensioner in a four-cycle engine in which a backward motion-preventing mechanism can be released from the outside and which is disposed in the cylinder block without increasing the size thereof.

To accomplish this object, according to the present invention, in a four-cycle engine of the overhead cam type in which a cam chain for driving an operational valve cam is provided in a cam chain chamber formed so as to vertically penetrate the cylinder block, the adjuster apparatus elastically contacts the back side of the chain tensioner for giving a tension to the cam chain and is provided in the space in the cylinder block. This adjuster apparatus is energized so as to always press the chain tensioner by the force of a spring and has a locking mechanism whose backward motion, due to the force imposed thereon by the cam chain, is prevented. The locking mechanism is released by the motion of a screw member, and a through hole with a closed cap which is adapted to be penetrated by a driver for rotating the screw member is formed in the cylinder block or crank casing.

With this constitution, the adjuster apparatus is arranged in the cylinder block and always elastically presses the chain tensioner. When the cam chain extends, the adjuster apparatus moves forward so as to follow this extension, and backward movement is contrarily prevented. Therefore, the timing for opening and closing the intake and exhaust valves are accurately maintained with a constant chain tension. When it is necessary to detach the cam chain for maintenance or the like, the cap is opened and a driver is inserted through the hole to rotate the screw member. Thus, the chain tensioner can be easily moved backward.

Therefore, the adjuster apparatus can be arranged in the necessary minimum space in the cylinder block. Thus, the size of engine is not increased, the degree of freedom of the layout of the engine is raised, the weight and cost of the engine are reduced, and the like.

The above and other objects and features of the present invention will become apparent from the following detailed description and the appended claims with reference to the accompanying drawings.

DETAILED DESCRIPTION

The first embodiment of the present invention will be described in detail hereinbelow with reference to the drawings.

Figure 1:
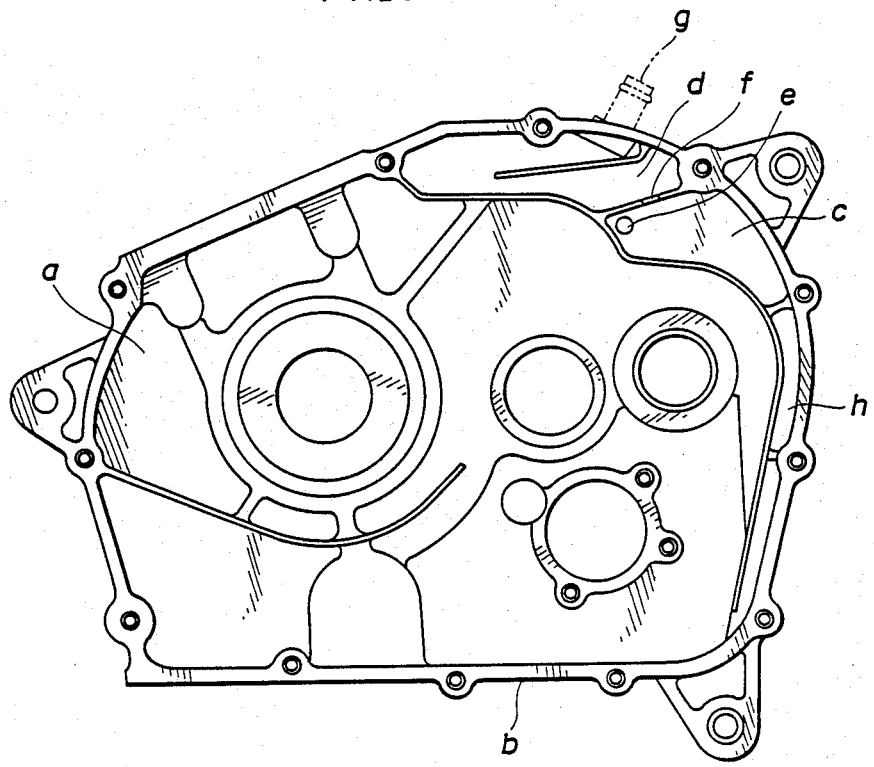
FIG. 1 is a side elevational view of the inside of a mission casing showing a conventional breather apparatus.
Figure 2:
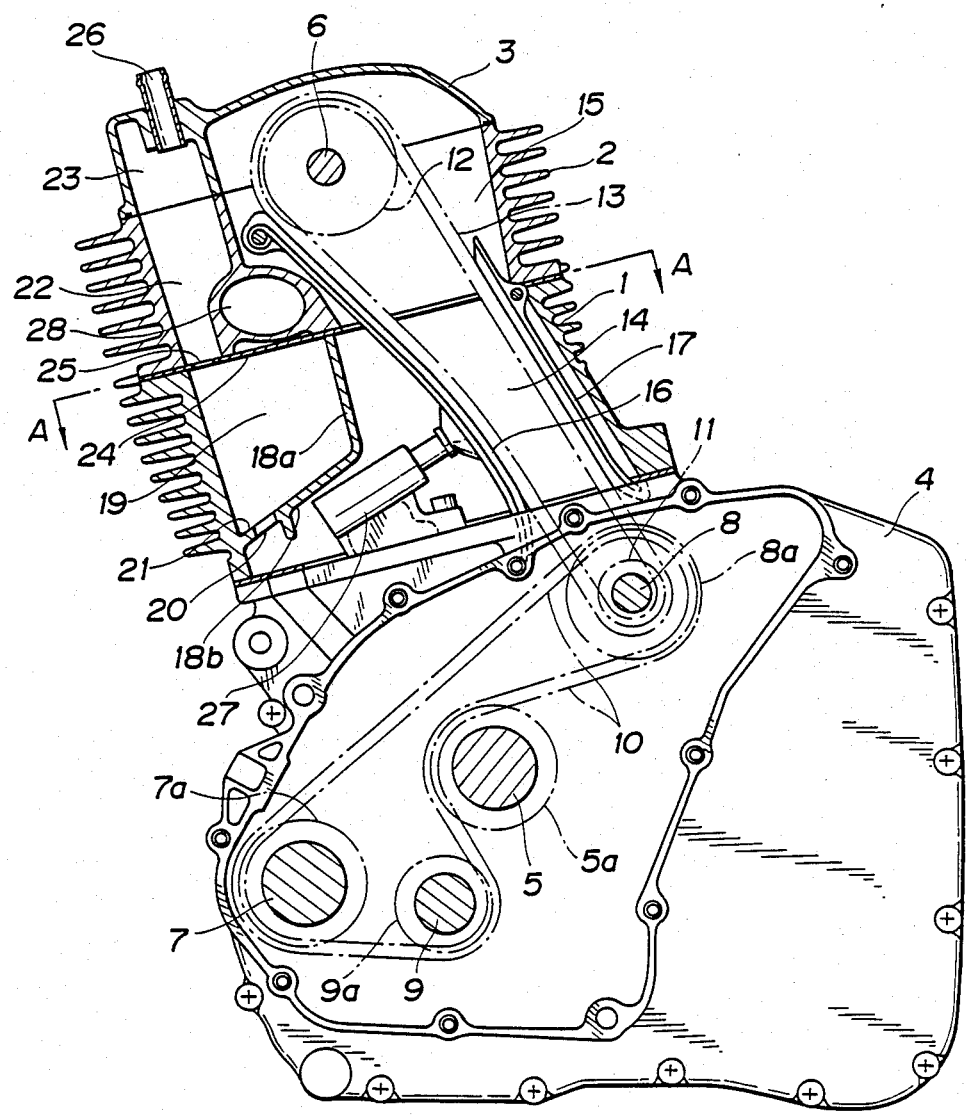
FIG. 2 is a side elevational view of an engine for two-wheeled motorcycles according to a first embodiment of the present invention in which a cylinder portion is vertically cut along the line B—B in FIG. 3 and a mission casing portion is shown with its side cover omitted.
Figure 3:
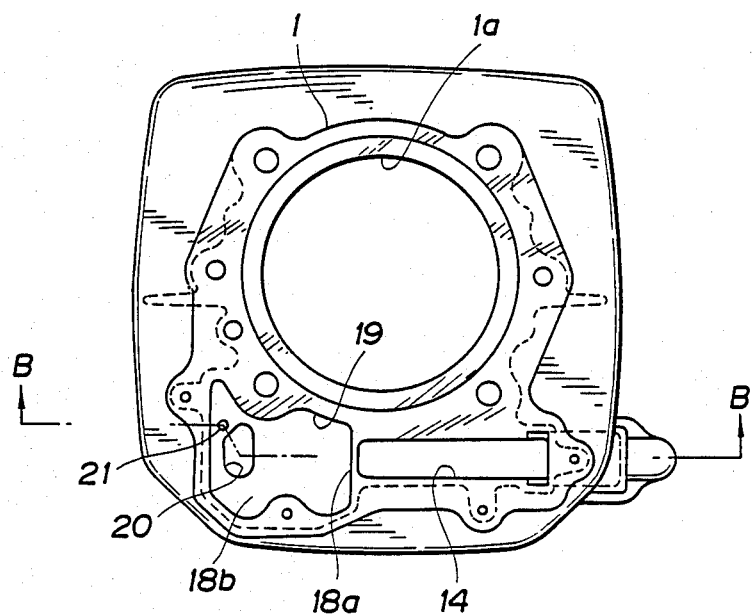
FIG. 3 is a plan view of a single cylinder block taken along the line A—A in FIG. 2.

FIG. 2 is a side elevational view of an operational valve cam drive system in a four-cycle engine for two-wheeled motorcycles in which an upper cylinder portion is vertically cut along the line B—B in FIG. 3 and a lower main casing portion is shown with a side cover omitted. FIG. 3 is a plan view of a single cylinder block taken along the line A—A in FIG. 2.

The engine cylinder portion is constituted by a cylinder block 1, a cylinder head 2, and a head cover 3. A main housing or casing 4 including therein a crank chamber 4a is interconnected with the lower portion of the engine cylinder portion. The main section of the engine comprises a cylinder 1a (FIG. 3), a piston, a crank, a connecting rod, intake and exhaust valves, an operational valve cam, and the like (not shown). Numeral 5 denotes a crank shaft and 6 indicates a cam shaft and these shafts are disposed in the lateral direction so as to perpendicularly cross the cylinder.

A front balancer shaft 7, a rear balancer shaft 8, and an idle shaft 9 are attached to the main casing 4 at positions in front of and behind the crank shaft 5. A balancer drive sprocket gear 5a is attached to the crank shaft 5. Front and rear balancer driven sprocket gears 7a and 8a are attached to the front and rear balancer shafts 7 and 8. An idle sprocket gear 9a is attached to the idle shaft 9. A single balancer chain 10 is meshingly engaged with the gears 5a, 7a, 8a, and 9a, thereby transmitting the rotation of the crank shaft 5 to drive the front and rear balancer shafts 7 and 8 at the same speed but in reverse directions.

A cam drive sprocket gear 11 is fixed in the rear balancer shaft 8. A cam chain 13 is meshed with the gear 11 and a cam driven sprocket gear 12 attached to the cam shaft 6, thereby driving the cam shaft 6 synchronously at $\frac{1}{2}$ the rotation of the crank shaft 5.

The cam chain 13 is suspended in cam chain chambers 14 and 15 which are formed in one side portion of each of the cylinder block 1 and cylinder head 2 so as to vertically penetrate them. Numeral 16 denotes a front chain tensioner and 17 indicates a rear chain tensioner. Since the gear 11 is located behind the crank shaft 5, the cam chain 13 is inclined backwardly and downwardly. The cam chain chamber 14 in the cylinder block 1 is located at a slightly rear position.

A breather chamber 19 is formed in the cylinder block 1, in front of the cam chain chamber 14, by partition walls 18a and 18b. A through hole 20 is formed in the partition wall 18b for communication with the bottom of the breather chamber 19. An oil return hole 21 is formed in the lowest portion of the breather chamber 19. Hollow spaces 22 and 23 are also respectively formed in the front portions of the cylinder head 2 and head cover 3, thereby together constituting a second breather chamber. The breather chamber 19 communicates with the second breather chamber 22, 23 by a through hole 25 formed in a gasket 24 interposed between the cylinder block 1 and the cylinder head 2. A breather hole 26 is formed in the upper surface of the head cover 3.

An adjuster apparatus 27 for the front cam chain tensioner 16 is disposed in the cam chain chamber 14. A hole 28 is also formed to insert an ignition plug.

The blow-by gases which collect in the crank chamber and mission casing 4 pass through the cam chain chamber 14 and enter the breather chamber 19 from the through hole 20. The blow-by gases pass through the hole 25 into the second breather chamber 22, 23 and are exhausted to an air cleaner or the like through the breather hole 26. During this period of time, the oil component is separated in the breather chamber 19 and second breather chamber. The separated oil component is returned through the oil return hole 21 into the mission casing 4.

As mentioned above, the cam chain chamber 14 is provided at a position which is deviated backward and the breather chamber 19 is arranged in front of the cam chain chamber 14, so that the breather chamber 19 having a large volume can be formed without enlarging the cylinder block 1. The breather chamber 19 is located just over the crank chamber and the gas can be easily led and the cylinder head can be easily communicated with the upper breather hole. The second breather chamber 22, 23 may also be omitted and the breather path can also be arranged in the thick portion of the cylinder head 2.

Figure 4:
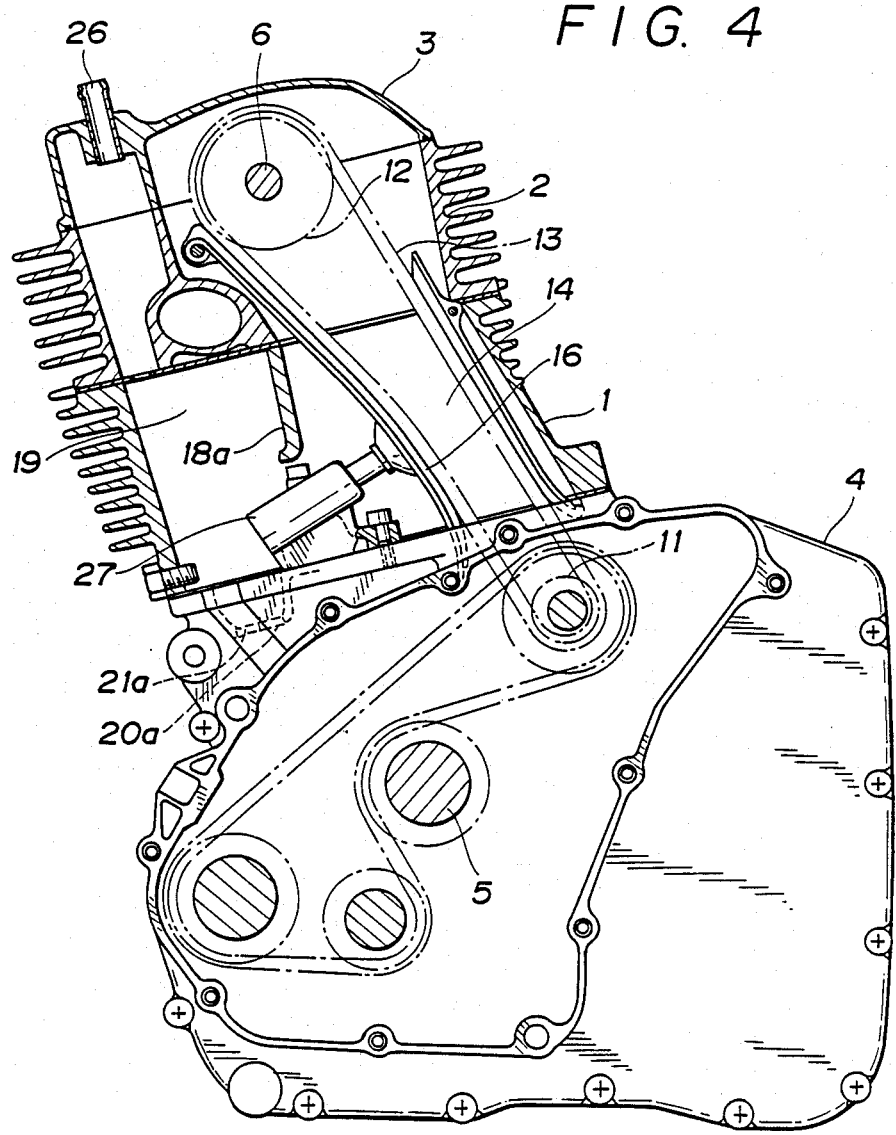
FIG. 4 is a side elevational view of an engine for two-wheeled motorcycles according to a second embodiment of the invention.

FIG. 4 shows a second embodiment in which the adjuster apparatus 27 is used as a part of the partition wall 18a and the partition wall 18b is omitted. A through hole 20a and an oil return hole 21a are formed in walls defining the joining surfaces between the main casing 4 and the cylinder block 1 so as to permit communication with the crank chamber.

As explained above, in the breather apparatuses for four-cycle engines according to the first and second embodiments, the cam chain chamber which vertically penetrates the cylinder block is deviated in one direction perpendicular to the plane through the crank shaft axis and the breather chamber is formed in the cylinder block in the opposite direction. The breather chamber having a sufficient volume can be formed without enlarging the dimensions of the cylinder block and engine. A compact engine can be obtained. There are effects such that the degree of freedom in layout when the engine is installed to two-wheeled motorcycles or the like can be increased without enlarging the frame or the like, and the cost and weight can be reduced.

A third embodiment of the invention will now be described hereinbelow with reference to FIGS. 5 to 8.

Figure 5:
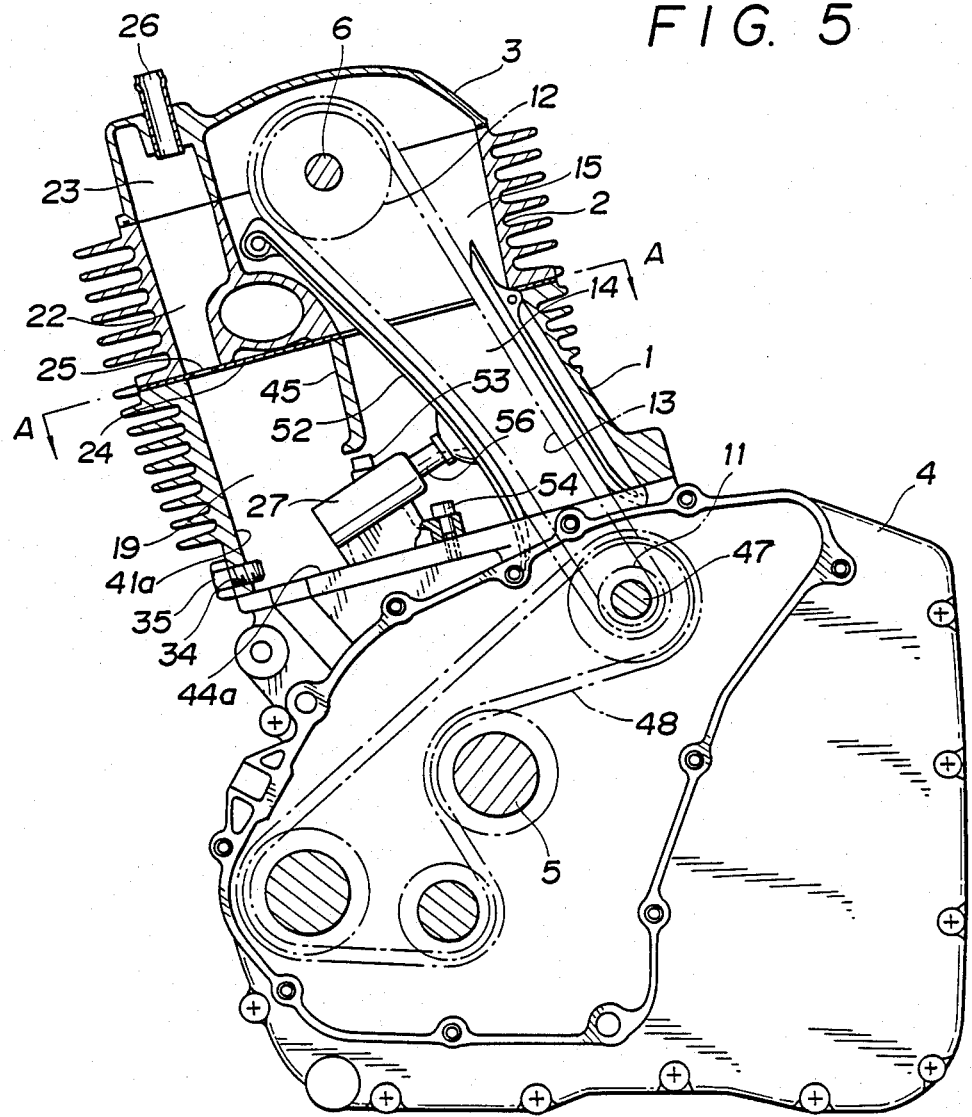
FIG. 5 is a side elevational view of an engine for two-wheeled motorcycles according to a third embodiment of the invention in which a cylinder portion is vertically cut along the line B—B in FIG. 6 and a mission casing portion is shown with its side cover omitted.
Figure 6:
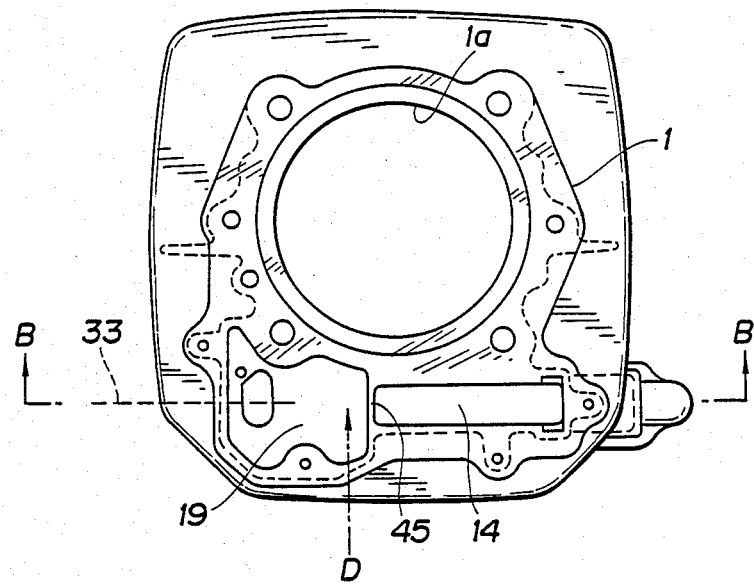
FIG. 6 is a plan view of a single cylinder block taken along the line A—A in FIG. 5.

FIG. 5 is a side elevational view of an operational valve cam drive system of a four-cycle engine for use in two-wheeled motorcycles in which an upper cylinder portion is vertically cut along the line B—B in FIG. 6 and a lower main casing portion is shown with a side cover omitted. FIG. 6 is a plan view of a single cylinder block taken along the line A—A in FIG. 5.

In FIGS. 5 to 8, the parts and components similar to those shown in FIGS. 2 to 4 are designated by the same reference numerals.

In this third embodiment, the main section of the engine cylinder portion is constituted in a manner similar to the first embodiment.

An intermediate shaft 47 is axially attached in the main casing 4 at a position behind the crank shaft 5 and the rotation is transferred from the crank shaft 5 to the intermediate shaft 47 via a chain 48. The cam drive sprocket gear 11 is fixed to the intermediate shaft 47. The cam chain 13 is suspended between the gear 11 and the cam driven sprocket gear 12 attached to the cam shaft 6. The cam shaft 6 is driven synchronously at $\frac{1}{2}$ the rotation of the crank shaft 5.

The cam chain 13 is suspended in the cam chain chambers 14 and 15 formed in one side portion of each of the cylinder block 1 and cylinder head 2 so as to vertically penetrate them. Since the intermediate shaft 47 is located behind the crank shaft 5, the cam chain 13 is suspended so as to be inclined backwardly and downwardly. In particular, the cam chain chamber 14 is located at a slightly rear position of the cylinder block 1. A chain tensioner 52 is disposed in front of the cam chain 13.

The breather chamber 19 is formed in the cylinder block 1 in front of the cam chain chamber 14 and is separated therefrom by a partition wall 45. The upper portion of the breather chamber 19 communicates with a second breather chamber 22, 23 via a through hole 25 in the gasket 24 between the cylinder block and cylinder head, and this second breather chamber 22, 23 communicates with breather hole 26.

The adjuster apparatus 27 imposes a pressing force to the chain tensioner 52 and is disposed in front of the chain tensioner 52 so as to be located in both of the cam chain chamber 14 and breather chamber 19. The adjuster apparatus 27 is fixed to a confronting surface 44a of the cylinder block 1 in the main casing 4 by bolts 53 and 54.

Figure 7:
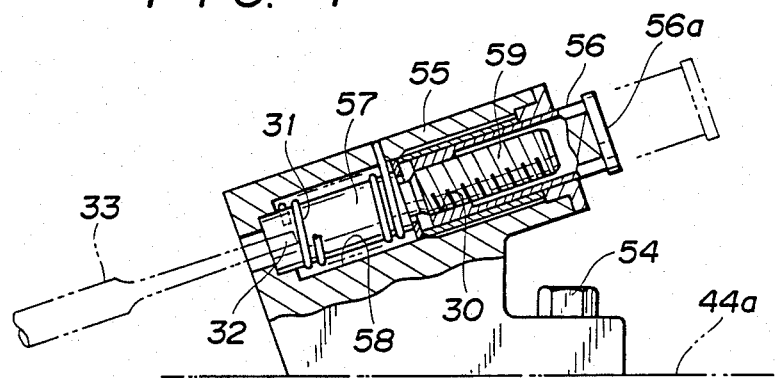
FIG. 7 is an enlarged vertical sectional side view of an adjuster apparatus.

As shown in FIG. 7, the adjuster apparatus 27 is constituted by a body 55, a pressure piece 56, and a drive screw 57. The pressure piece 56 is non-rotatably fitted into a shaft hole 58 in the body 55 so as to be slidable in the axial direction. A tip 56a of the pressure piece 56 comes into contact with the back side of the chain tensioner 52. The drive screw 57 is rotatably fitted into the shaft hole 58 and cannot move in the axial direction. A screw portion 59 of the drive screw 57 is threaded into a female screw 30 of the hole in the pressure piece 56. On the other hand, the drive screw 57 is urged so as to be rotated in one direction by elastically attaching a torsion spring 31 between the drive screw 57 and the body 55. By this rotational force, the pressure piece 56 always pushes against the chain tensioner 52. The pushed pressure piece 56 is not returned by the force on the cam chain side because of the screw mechanism.

When the pressure piece 56 is to be retracted, a driver 33 is engaged within a groove 32 formed in the inner end of the drive screw 57 for rotating the drive screw 57 in the reverse direction against the elastic force of the torsion spring 31. A through hole 34 is formed in a side wall 41a of the cylinder block 1 on a line extending to the front portion of the drive screw 57 and is closed by a screw plug 35.

Figure 8:
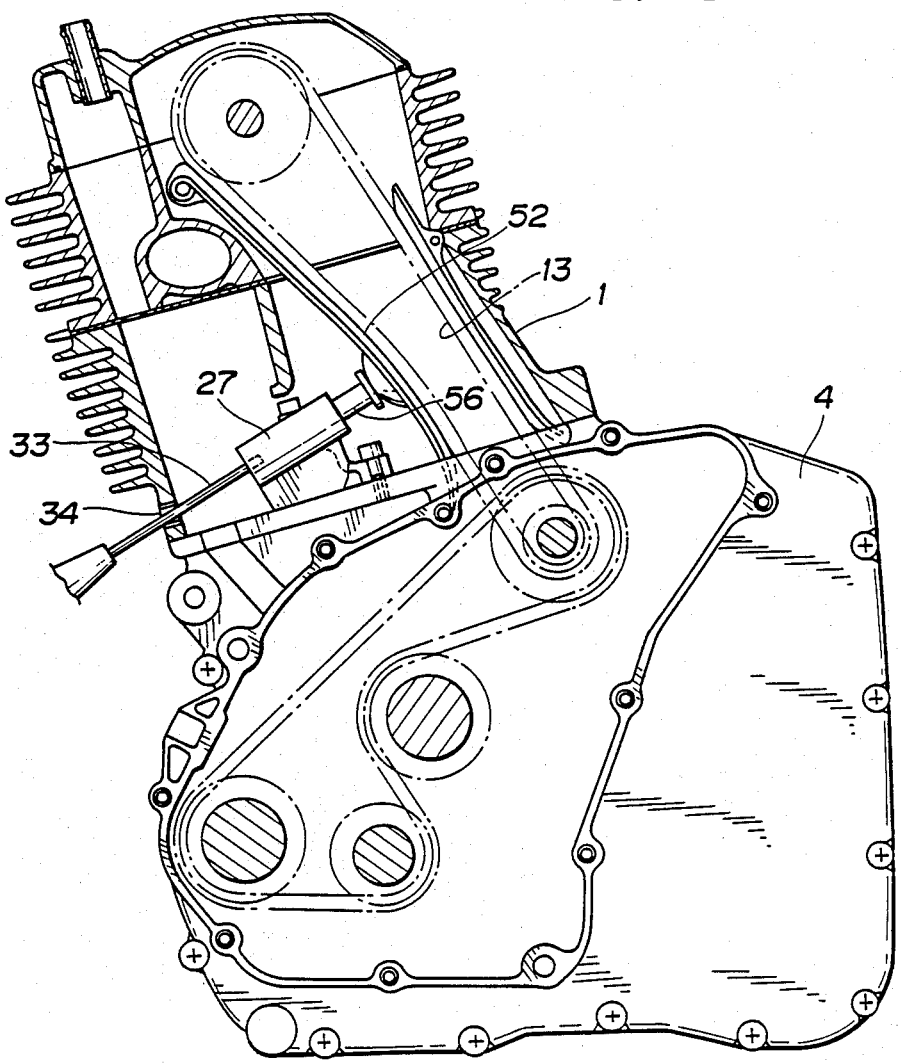
FIG. 8 is a side elevational view of an engine showing the operating state to release the backward motion-preventing mechanism of the adjuster apparatus.

As mentioned above, the adjuster apparatus 27 is provided in the cylinder block 1 The pressure piece 56 pushes the chain tensioner 52 so as not to be moved backward and follows the extension of the cam chain 13 and always gives a constant tension to the cam chain 13, thereby maintaining a stable operation. If it is necessary to detach the cam chain 13 for maintenance or the like, as shown in FIG. 8, the screw plug 35 is removed and the driver 33 is inserted through the hole 34 and the chain tensioner 52 is released by the foregoing operation.

There is also an adjuster apparatus having a backward motion-preventing mechanism using a ratchet in which a pressing screw is pushed to release the backward motion-preventing mechanism. In this case, it is sufficient to arrange the pressing screw to the side surface of the adjuster apparatus and to form the driver through hole in the side surface of the cylinder block 1 as indicated by an arrow D in FIG. 6.

In this manner, since the backward motion-preventing mechanism can be released from the outside by use of only one driver, the inner space to attach the adjuster apparatus can be minimized and an enlargement of the cylinder block can be prevented.

As described above, in the adjuster apparatus of the cam chain tensioner in four-cycle engines according to the third embodiment, the driver through hole with a plug is formed in the cylinder block and the backward motion-preventing mechanism can be released by the driver. Such an adjuster apparatus is provided in the cylinder block. Therefore, there are effects such that the space to dispose the adjuster apparatus in the cylinder block can be minimized, the enlargement of the engine can be prevented, a degree of freedom of layout of the engine is increased, the outside appearance is not adversely influenced, and the weight and cost can be reduced.

The present invention is not limited to the foregoing embodiments but many modifications and variations are possible within the spirit and scope of the appended claims of the invention.

The embodiments of the invention in which an exclusive property or privilege is claimed are defined as follows:

1. In a breather apparatus for a four-cycle engine of overhead cam type in which a cam chain to drive an operational valve cam is suspended in a cam chain chamber formed so as to vertically penetrate a cylinder block, wherein said cam chain chamber is arranged at a position deviated in one direction perpendicular to a crank shaft, a breather chamber adjacent to said cam chain chamber is formed in the cylinder block in the opposite direction, and said breather chamber is connected to a breather hole which opens to an upper portion of a cylinder head.

2. A breather apparatus according to claim 1, wherein an adjuster apparatus for a front cam chain tensioner which is disposed in said cam chain chamber is used as part of a partition wall to define the breather chamber, and a through hole and an oil return hole are formed in a joint surface portion of the cylinder block and the adjuster apparatus.

3. An adjuster apparatus of a cam chain tensioner for a four-cycle engine of overhead cam type in which a cam chain to drive an operational valve cam is suspended in a cam chain chamber formed so as to vertically penetrate a cylinder block,
said adjuster apparatus which is disposed so as to elastically contact a back side of a chain tensioner to impose a tension to said cam chain is arranged in a space in the cylinder block, the adjuster apparatus has a locking mechanism which is urged by a force of a spring so as to always push the chain tensioner and whose backward motion by a force from the cam chain is prevented, said locking mechanism is released by the movement of a screw member, and a through hole with a closing plug is formed in the cylinder block or a crank casing and is adapted to receive a driver to rotate said screw member.

4. In a four-cycle engine of the overhead cam type, including a casing defining a crank chamber therein, a cylinder block defining a cylinder bore therein which at its inner end is in open communication with the crank chamber, a crank shaft rotatably supported within the crank chamber for rotation about an axis, a piston slidably supported within the cylinder bore for reciprocation thereof along the longitudinal direction of said bore and being drivingly coupled to said crank shaft, and a cam shaft rotatably supported adjacent the outer end of the cylinder bore for rotation about an axis generally parallel with the crank shaft axis, the improvement comprising: a chain chamber formed in said cylinder block closely adjacent one side of said cylinder bore but isolated therefrom, said chain chamber being in open communication with said crank chamber, a chain extending through said chain chamber from said crank chamber for rotatably driving said cam shaft, a breather chamber formed in said cylinder block closely adjacent said one side of said cylinder bore but isolated therefrom, said breather chamber also being disposed closely adjacent said chain chamber but substantially separated therefrom by an intermediate partition wall, said chain chamber being displaced sidewardly relative to a plane defined by said cam shaft axis and a longitudinal axis of said cylinder bore axis so as to be disposed primarily on one side of said plane, and said breather chamber being disposed on the other side of said plane, said breather chamber communicating with one of said chain and crank chambers through a first small opening which communicates with a lower part of said breather chamber, and a second small opening communicating with an upper part of said breather chamber for exhausting gas pressure therefrom.

5. An engine according to claim 4, wherein the breather chamber is also isolated from the crank chamber by a wall structure therebetween, said first opening being formed in said wall structure so as to provide communication with the lower portion of said breather chamber, and a third small opening extending through said wall structure for providing communication between the lower portion of said breather chamber and said crank chamber for permitting oil to flow from said breather chamber through said third small opening into said crank chamber.

6. An engine according to claim 5, including an adjustable tensioning device having a part disposed for engaging the chain as disposed in said chain chamber for creating a tension in said chain, said adjustable tension device being mounted substantially on and forming part of the partition wall which sidewardly separates the breather and chain chambers.

7. An engine according to claim 4, including first and second balancing shafts rotatably supported on said casing in generally parallel relationship within said crank chamber and driven from said crank shaft, said first and second balancing shafts being disposed on opposite sides of said plane, and said chain being drivingly engaged with a sprocket mounted on the balancing shaft which is disposed on said one side of said plane.

* * * * *